(12) United States Patent
Draney et al.

(10) Patent No.: US 7,883,306 B2
(45) Date of Patent: Feb. 8, 2011

(54) ATTACHMENT BOLT AND TENSIONED SUPPORT SYSTEM USING SAME

(75) Inventors: Ryan Draney, Goddard, KS (US); Grady Harrison, Wichita, KS (US)

(73) Assignee: Cessna Aircraft Company, Wichita, KS (US)

( * ) Notice: Subject to any disclaimer, the term of this patent is extended or adjusted under 35 U.S.C. 154(b) by 238 days.

(21) Appl. No.: 12/233,281

(22) Filed: Sep. 18, 2008

(65) Prior Publication Data
US 2010/0064473 A1 Mar. 18, 2010

(51) Int. Cl.
*F16B 35/00* (2006.01)
(52) U.S. Cl. ............... 411/380; 244/118.3; 292/262
(58) Field of Classification Search ........... 411/380, 411/381; 74/502.6; 16/82; 292/262; 49/147; 244/129.6, 118.3
See application file for complete search history.

(56) References Cited

U.S. PATENT DOCUMENTS

| | | | | |
|---|---|---|---|---|
| 1,264,569 | A * | 4/1918 | Stafford | 411/374 |
| 1,679,161 | A * | 7/1928 | Kindervater | 411/380 |
| 2,375,548 | A | 5/1945 | Gilmore | |
| 2,571,052 | A | 10/1951 | Mount | |
| 2,910,255 | A * | 10/1959 | Johnson | 244/129.6 |
| 3,128,068 | A * | 4/1964 | Pauli | 244/129.5 |
| 4,195,798 | A | 4/1980 | Costantino et al. | |
| 4,440,364 | A * | 4/1984 | Cone et al. | 244/129.6 |
| 4,453,684 | A * | 6/1984 | Hanks | 244/129.5 |
| 5,312,150 | A * | 5/1994 | Quam | 296/62 |
| 5,584,212 | A * | 12/1996 | Wild | 74/502.6 |
| 5,615,922 | A * | 4/1997 | Blanchard | 296/37.6 |
| 5,778,729 | A * | 7/1998 | Tsai | 74/489 |
| 6,279,979 | B1 * | 8/2001 | Cauley | 296/57.1 |
| 6,460,915 | B1 * | 10/2002 | Bedi et al. | 296/183.1 |
| 6,461,071 | B1 | 10/2002 | Kanemura | |
| 6,591,461 | B2 | 7/2003 | Salentine et al. | |
| 7,303,052 | B2 * | 12/2007 | Tsai | 188/24.19 |

OTHER PUBLICATIONS

"Distingushing Bolts from Screws", U.S. Customs and Border Protection (Mar. 2006).
"Distinguishing Bolts from Screws", U.S. Customs and Border Protection (Mar. 2010).

* cited by examiner

*Primary Examiner*—Gary Estremsky
(74) *Attorney, Agent, or Firm*—Lathrop & Gage LLP

(57) ABSTRACT

Attachment bolts and tensioned support systems (e.g., aircraft access systems) are set forth herein. According to one embodiment, an attachment bolt for use in a tensioned support system includes a head portion and a shaft portion extending from the head portion. The head portion has an end face, and the shaft portion has at least one thread and a tip distal to the head portion. A cavity extends entirely through the head and shaft portions and has a linearly extruded segment, an extended diameter at the end face, and an enlarged diameter at the tip. The extended diameter is larger than a diameter of the linearly extruded segment, and the enlarged diameter is larger than the diameter of the linearly extruded segment.

20 Claims, 5 Drawing Sheets

ATTACHMENT BOLT AND TENSIONED SUPPORT SYSTEM USING SAME

BACKGROUND

The present invention relates generally to fasteners, and specifically to fasteners that may be utilized in tensioned support systems, such as those used in some aircraft (e.g., in aircraft access systems).

SUMMARY

According to one embodiment, an attachment bolt for use in a tensioned support system includes a head portion and a shaft portion extending from the head portion. The head portion has an end face, and the shaft portion has at least one thread and a tip distal to the head portion. A cavity extends entirely through the head and shaft portions and has a linearly extruded segment, an extended diameter at the end face, and an enlarged diameter at the tip. The extended diameter is larger than a diameter of the linearly extruded segment, and the enlarged diameter is larger than the diameter of the linearly extruded segment.

According to another embodiment, an attachment bolt for securing an end of a tension member includes a head portion and a shaft portion extending from the head portion. The head portion has an end face, and the shaft portion is threaded and has a tip distal to the head portion. A cavity extends continuously from the end face to the tip, and the cavity is sized to allow at least a part of the tension member to pass through. The cavity has a segment of generally constant cross-section that extends a majority of the length between the end face and the tip.

According to still another embodiment, a tensioned support system includes a cable and an attachment bolt. The attachment bolt includes a head portion and a shaft portion extending from the head portion. The head portion has an end face, and the shaft portion is threaded and has a tip distal to the head portion. A cavity extends entirely through the head and shaft portions. The cavity has a linearly extruded segment, an extended diameter at the end face, and an enlarged diameter at the tip. The extended diameter is larger than a diameter of the linearly extruded segment, and the enlarged diameter is larger than the diameter of the linearly extruded segment. The head portion is rounded between the extended diameter and the linearly extruded segment. A terminal element is operatively coupled to or formed from the cable. The terminal element has a diameter greater than the diameter of the linearly extruded segment, and the terminal element is seated in the enlarged diameter. At least one of the cable or an element operatively coupling the cable to the terminal element passes through the linearly extruded segment and the extended diameter. A receiving component has internal threads that correspond to the threaded shaft portion of the attachment bolt. The threads of the attachment bolt and the threads of the receiving component couple the attachment bolt to the receiving component.

According to still yet another embodiment, an aircraft access system includes aircraft entry steps rotatable between a storage configuration and a use configuration. A first receiving component has internal threads and is operatively coupled to an aircraft fuselage. A second receiving component has internal threads and is operatively coupled to the aircraft entry steps. A cable has first and second ends. A first attachment bolt includes a head portion and a shaft portion extending from the head portion. The head portion has an end face. The shaft portion is threaded and has a tip distal to the head portion. The first attachment bolt threads are complementary to the internal threads of the first receiving component. A cavity extends entirely through the head and shaft portions. The cavity has a linearly extruded segment, an extended diameter at the end face, and an enlarged diameter at the tip; the extended diameter is larger than a diameter of the linearly extruded segment, and the enlarged diameter is larger than the diameter of the linearly extruded segment. The head portion is rounded between the extended diameter and the linearly extruded segment. A second attachment bolt includes a head portion and a shaft portion extending from the head portion. The head portion has an end face. The shaft portion is threaded and has a tip distal to the head portion. The second attachment bolt threads are complementary to the internal threads of the second receiving component. A cavity extends entirely through the head and shaft portions. The cavity has a linearly extruded segment, an extended diameter at the end face, and an enlarged diameter at the tip; the extended diameter is larger than a diameter of the linearly extruded segment, and the enlarged diameter is larger than the diameter of the linearly extruded segment. The head portion is rounded between the extended diameter and the linearly extruded segment. A first terminal element is operatively coupled to or formed from the cable first end, and a second terminal element is operatively coupled to or formed from the cable second end. The first terminal element has a diameter greater than the diameter of the linearly extruded segment of the first attachment bolt, and the first terminal element is seated in the enlarged diameter of the first attachment bolt. At least one of the cable or an element operatively coupling the cable to the first terminal element passes through the linearly extruded segment of the first attachment bolt and the extended diameter of the first attachment bolt. The second terminal element has a diameter greater than the diameter of the linearly extruded segment of the second attachment bolt, and the second terminal element is seated in the enlarged diameter of the second attachment bolt. At least one of the cable or an element operatively coupling the cable to the second terminal element passes through the linearly extruded segment of the second attachment bolt and the extended diameter of the second attachment bolt. The threads of the first attachment bolt and the threads of the first receiving component couple the first attachment bolt to the first receiving component, and the threads of the second attachment bolt and the threads of the second receiving component couple the second attachment bolt to the second receiving component.

DETAILED DESCRIPTION

Figure 1:
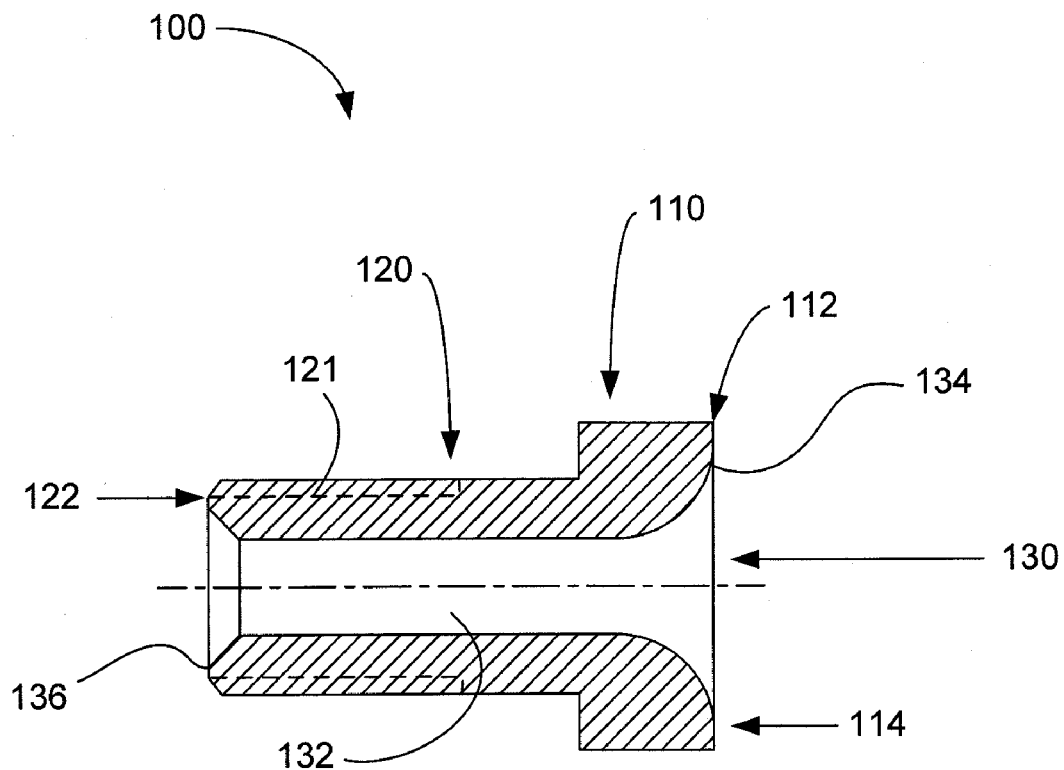
FIG. 1 is a sectional view of an attachment bolt according to an embodiment, the bolt's threads being omitted.
Figure 2:
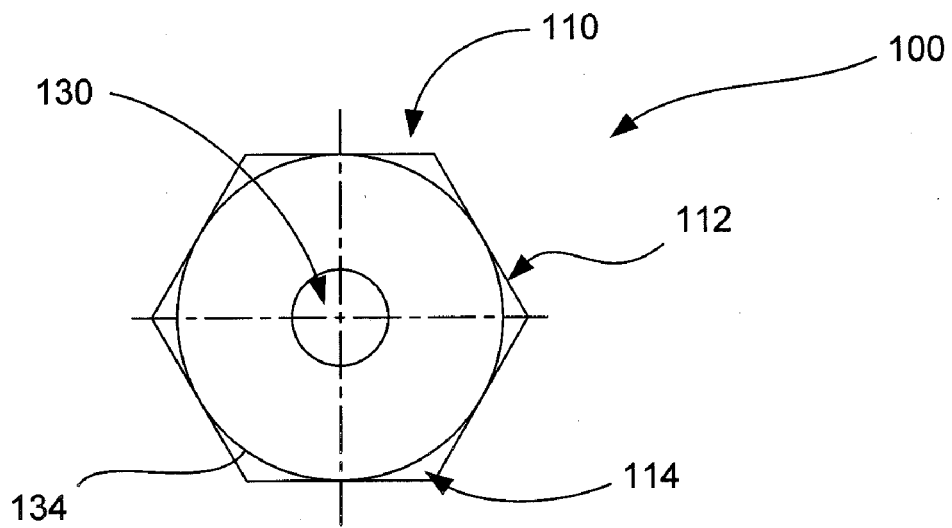
FIG. 2 is an end view of the head of the attachment bolt of FIG. 1.

As shown in FIGS. 1 and 2, an attachment bolt 100 includes a head portion 110 and an abutting shaft portion 120. The shaft portion 120 includes threads 121, as is typical of prior art bolts. The term "bolt" is used herein to refer both to fasteners generally referred to as bolts (i.e., fasteners that must be assembled with nuts to perform as intended) as well as those generally referred to as screws (i.e., fasteners that must be torqued by their heads, such as into tapped or otherwise preformed holes, to perform as intended). In some embodiments, the threads and a perimeter 112 (i.e., external configuration) of the head portion 110 correspond generally to a standard MS35308 bolt. It should be understood, however, that other threads and perimeters 112 may be used.

Still referring to FIG. 1, a cavity 130 extends through the head portion 110 and the shaft portion 120. In at least some embodiments, a linearly extruded segment 132 (i.e., a segment having a generally constant cross-section) of the cavity 130 is generally cylindrical, though the linearly extruded segment 132 may alternately be shaped differently (e.g., as an extruded oval, extruded triangle, extruded rectangle, extruded pentagon, extruded hexagon, etc.).

The cavity 130 has an extended diameter 134 at an end face 114 of the head portion 110, and the inner surface of the cavity 130, in the disclosed embodiment, is flared outward from the extruded segment 132 to the extended diameter 134 to eliminate pointed edges between the extruded segment 132 and the extended diameter 134. Distal to the extended diameter 134 (i.e., at a tip 122 of the shaft portion 120), the cavity 130 has an enlarged diameter 136. The enlarged diameter 136 may be angled (as shown) or rounded (i.e., in a concave or convex manner) relative to the extruded segment 132. The cavity 130 may be formed along with the head and shaft portions 110, 120 in a casting or molding process, for example, or the cavity 130 may be formed in a bolt having solid head and shaft portions 110, 120, such as through boring, rounding, and chamfering operations. In at least one embodiment, the cavity 130 is generally centered along an imaginary center line that extends from the end face 114 to the tip 122.

Figure 3:
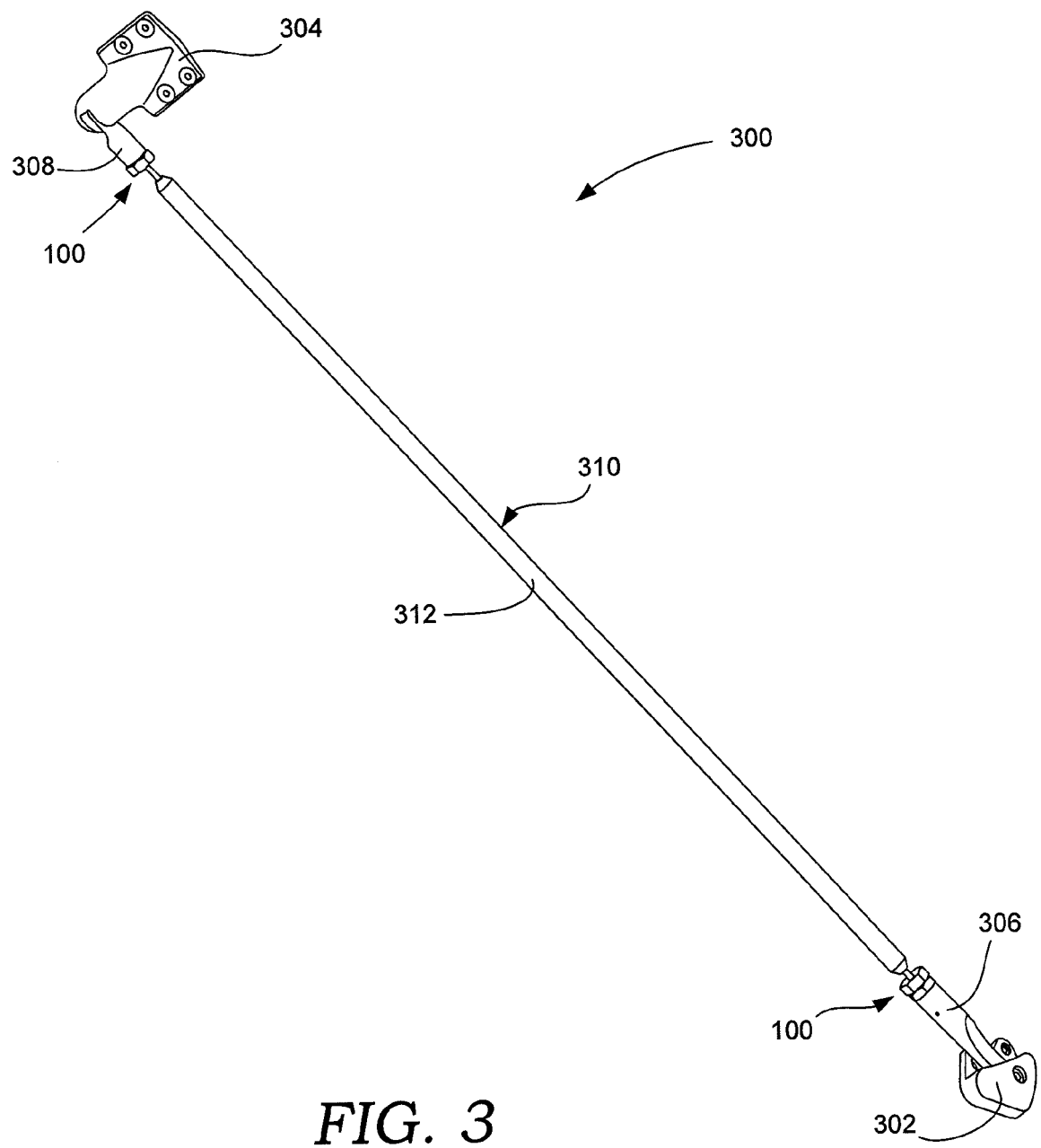
FIG. 3 is a perspective view showing two of the attachment bolts of FIG. 1 in use with a tensioned support system.
Figures 4A, 4B:
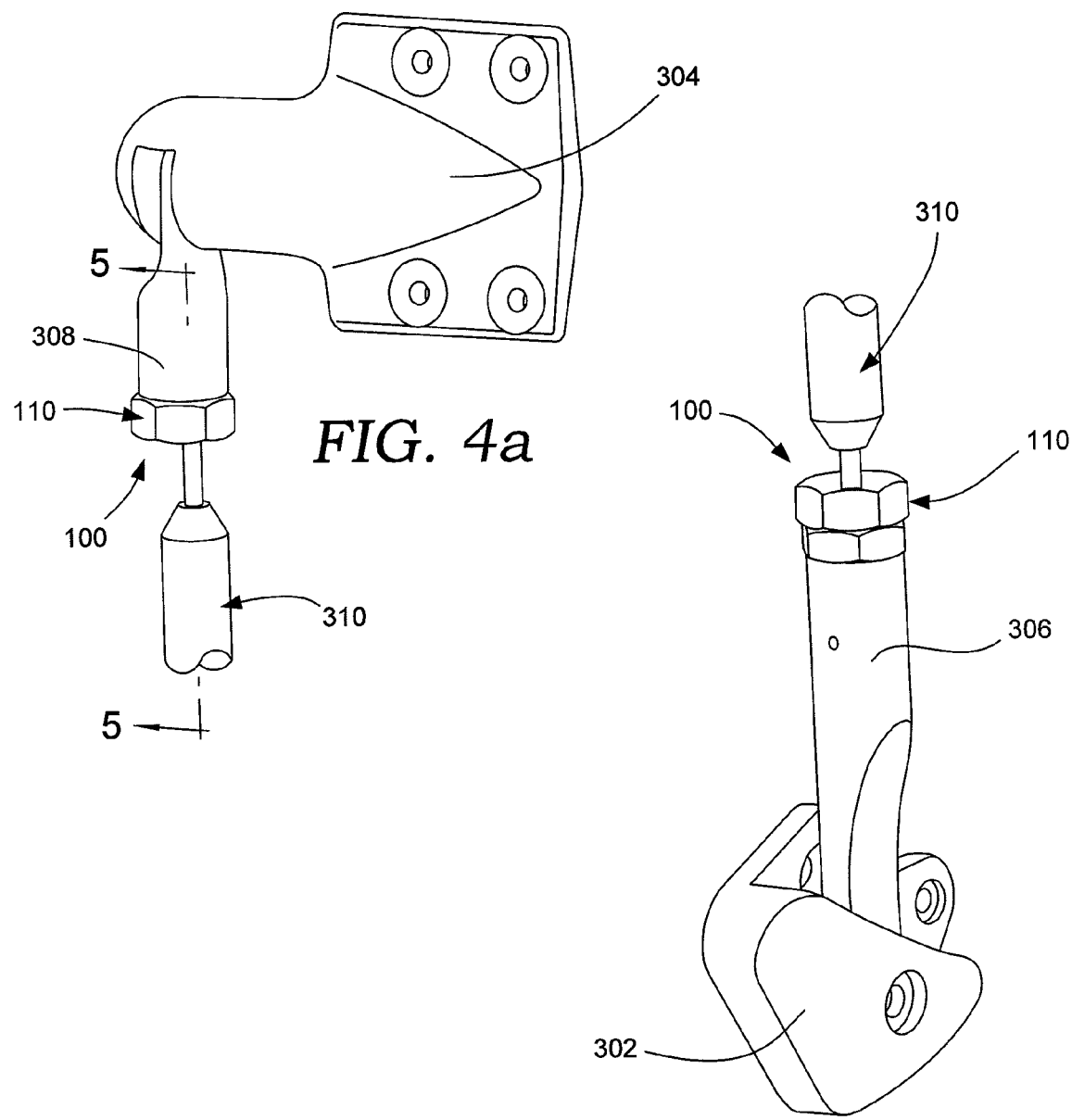
FIG. 4a is a perspective view showing one portion of FIG. 3.
FIG. 4b is a perspective view showing another portion of FIG. 3.
Figure 7:
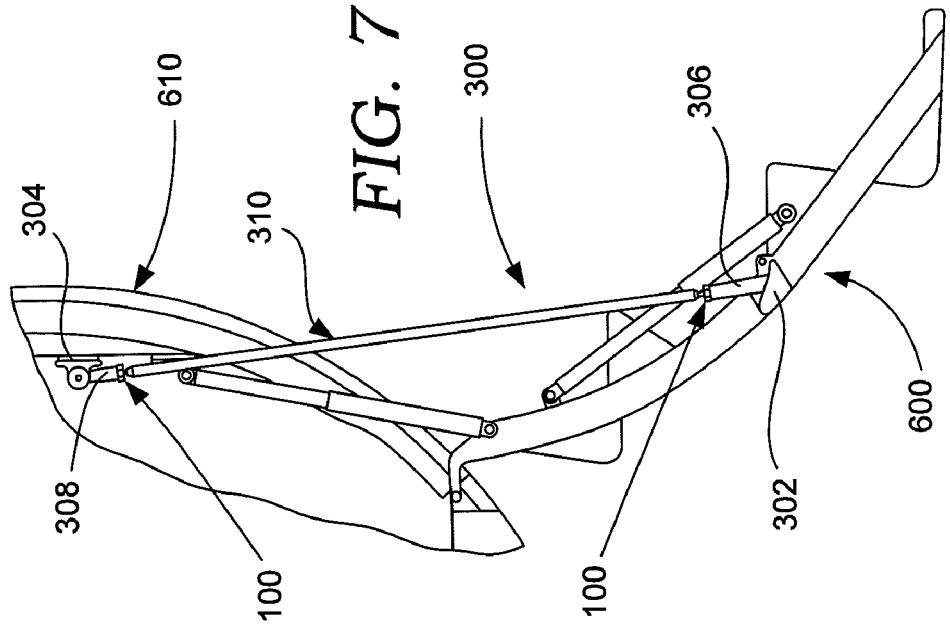
FIG. 7 is a side view of FIG. 6.

The attachment bolt 100 may be used in various situations and systems. As shown in FIG. 3 through FIG. 7, the attachment bolt 100 may be used in a tensioned support system 300. The specific tensioned support system 300 shown in FIG. 3 through FIG. 4b is used in attaching entry steps 600 (i.e., "Airstairs") to an aircraft fuselage 610, as shown in FIGS. 6 and 7, though the use of the attachment bolt 100 is clearly not limited to such a system. The tensioned support system 300 includes a bracket 302 for attachment to the entry steps 600 and another bracket 304 for attachment to the aircraft fuselage 610. A receiving member 306 may be coupled (e.g., rotatably coupled) to the bracket 302, and a receiving member 308 may be coupled (e.g., rotatably coupled) to the bracket 304. Though not shown in detail, each receiving member 306, 308 includes an open interior area that is threaded.

One attachment bolt 100 is coupled to the receiving member 306 by mating the threads of its shaft portion 120 with the threads of the receiving member 306, and another attachment bolt 100 is coupled to the receiving member 308 by mating the threads of its shaft portion 120 with the threads of the receiving member 308. A cable 310 spans between the respective attachment bolts 100, and the cable 310 may be generally covered with silicone 312 or may have a sleeve constructed of another material.

Figure 5:
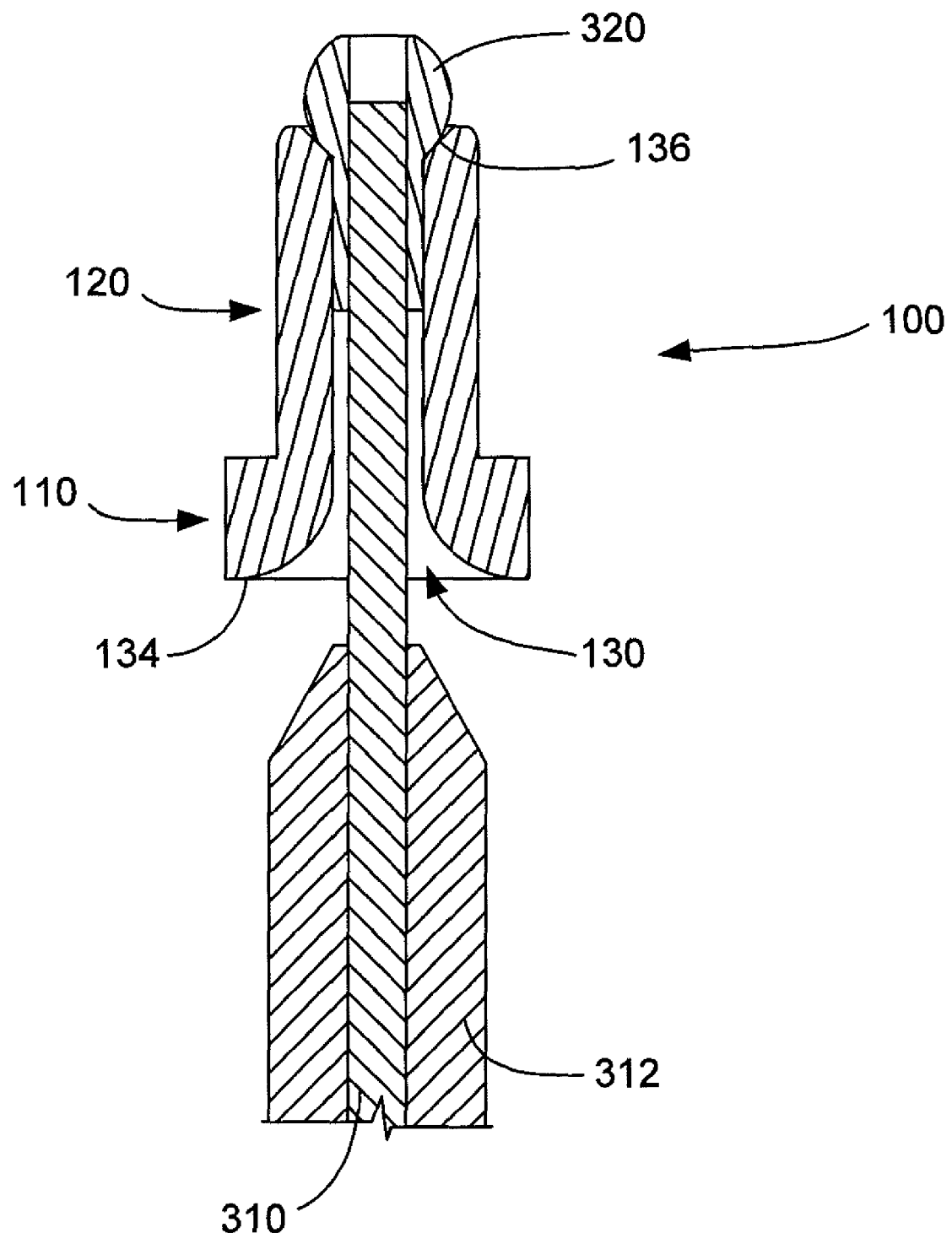
FIG. 5 is a sectional view showing the attachment bolt of FIG. 1 in use with part of the tensioned support system of FIG. 3.
Figure 6:
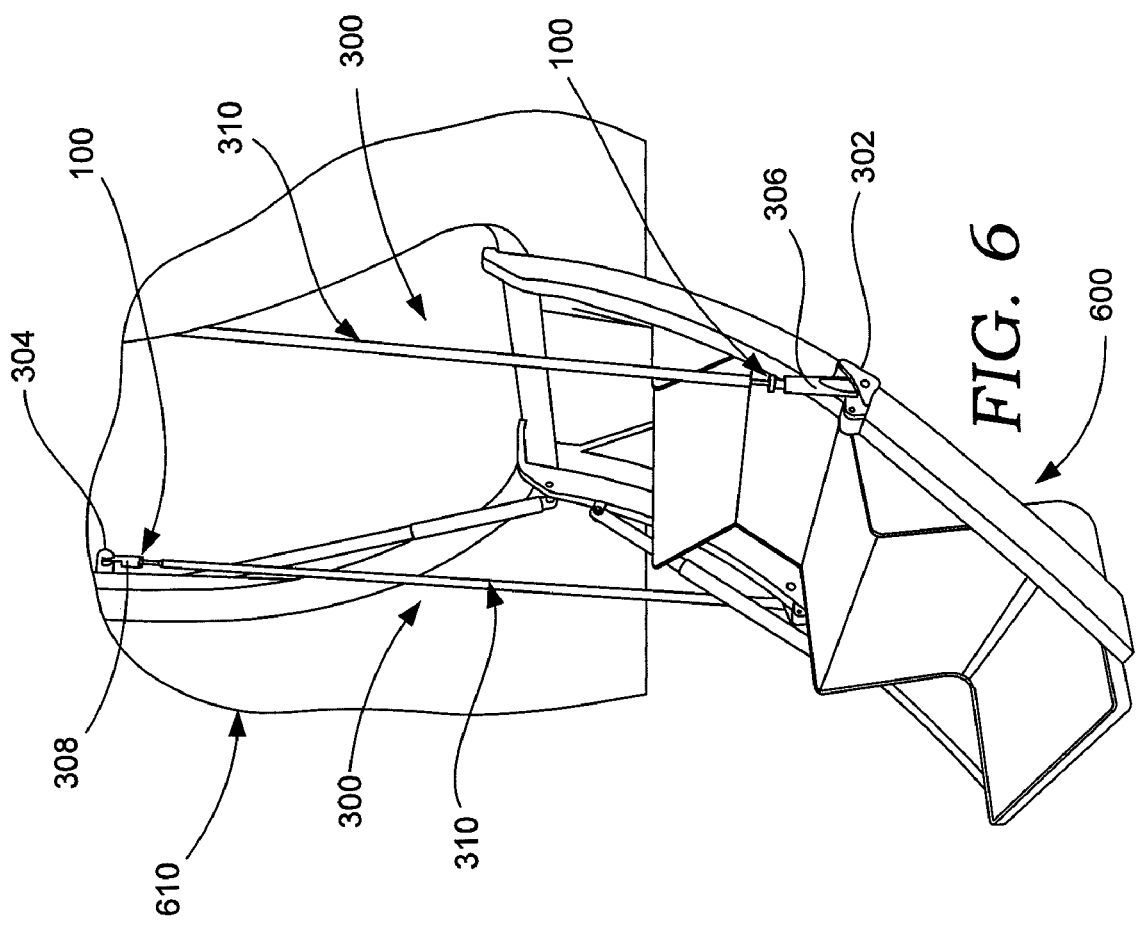
FIG. 6 is a perspective view showing the tensioned support system of FIG. 3 attaching entry steps to an aircraft fuselage.

As shown in FIG. 5, the cable 310 passes through the cavity 130 of each attachment bolt 100, and a terminal element 320 (e.g., a ball or other endpiece) may be coupled to or formed from each end of the cable 310. At least one of the terminal elements 320 is coupled to or formed from a respective cable end after the cable end passes through a bolt cavity 130. The terminal element 320 is sized so as not to fit through the bolt cavity 130, and the terminal element 320 may be seated in the enlarged diameter 136 of the bolt cavity 130 so that the section of the shaft portion 120 adjacent the enlarged diameter 136 acts as a bearing surface. The cable 310 may be rotated relative to the attachment bolt 110 with minimal wear on the cable 310 since the head portion 110 is rounded between the extruded segment 132 (FIG. 1) and the extended diameter 134 to eliminate pointed edges between the extruded segment 132 and the extended diameter 134. In use, then, returning to FIG. 3, the threads of each attachment bolt 100 are mated with threads of a respective receiving member 306, 308 to operatively couple the attachment bolts 100 to the respective brackets 302, 304, and the terminal elements 320 (FIG. 5) prevent the cable 310 from separating from the attachment bolts 100, all of which allows the cable 310 to remain in tension (e.g., between the entry steps 600 and the aircraft fuselage 610).

As noted above, attachment bolts 100 may be used in various situations and systems. In addition to the specific support system 300 discussed above for use in attaching entry steps 600 (i.e., "Airstairs") to an aircraft fuselage 610, the attachment bolts 100 may be used for automobile tailgates, bridges, and other applications needing a tensioned force transfer member.

Those skilled in the art appreciate that variations from the specified embodiments disclosed above are contemplated herein and that the described embodiments are not limiting. The description should not be restricted to the above embodiments, but should be measured by the following claims.

We claim:

1. A tensioned support system, comprising:
   a cable;
   an attachment bolt, comprising:
      a head portion having an end face;
      a shaft portion extending from the head portion, the shaft portion being threaded and having a tip distal to the head portion; and
      a cavity extending entirely through the head and shaft portions; the cavity having a linearly extruded segment, an extended diameter at the end face, and an enlarged diameter at the tip; the extended diameter being larger than a diameter of the linearly extruded segment; the enlarged diameter being larger than the diameter of the linearly extruded segment; the head portion being rounded between the extended diameter and the linearly extruded segment;
   a terminal element operatively coupled to or formed from the cable, the terminal element having a diameter greater than the diameter of the linearly extruded segment, the terminal element being seated in the enlarged diameter, at least one of the cable or an element operatively coupling the cable to the terminal element passing through the linearly extruded segment and the extended diameter; and
   a receiving component having internal threads that correspond to the threaded shaft portion of the attachment bolt;
   wherein the threads of the attachment bolt and the threads of the receiving component couple the attachment bolt to the receiving component; and wherein the receiving component is coupled to a bracket for attachment to one of:
(a) entry steps; or
(b) an aircraft fuselage.

2. The tensioned support system of claim 1, wherein the receiving component is rotatably coupled to the bracket.

3. The tensioned support system of claim 2, wherein:
the enlarged diameter is angled, rounded in a concave manner, or rounded in a convex manner relative to the extruded segment;
the linearly extruded segment extends a majority of the length between the end face and the tip;
the linearly extruded segment is generally cylindrical; and
the cavity is generally centered along an imaginary center line that extends from the end face to the tip.

4. The tensioned support system of claim 3, wherein the cavity is formed along with the head and shaft portions in a casting or molding process.

5. The tensioned support system of claim 3, wherein the cavity is formed in the head and shaft portions through at least one of a boring operation, a rounding operation, or a chamfering operation.

6. The tensioned support system of claim 1, wherein the enlarged diameter is angled, rounded in a concave manner, or rounded in a convex manner relative to the extruded segment.

7. The tensioned support system of claim 1, wherein the linearly extruded segment extends a majority of the length between the end face and the tip, and wherein the linearly extruded segment is generally cylindrical.

8. The tensioned support system of claim 1, wherein the cavity is generally centered along an imaginary center line that extends from the end face to the tip.

9. An aircraft access system, comprising:
aircraft entry steps rotatable between a storage configuration and a use configuration;
a first receiving component having internal threads and being operatively coupled to an aircraft fuselage;
a second receiving component having internal threads and being operatively coupled to the aircraft entry steps;
a cable having first and second ends;
a first attachment bolt, comprising:
  a head portion having an end face;
  a shaft portion extending from the head portion, the shaft portion being threaded and having a tip distal to the head portion, the first attachment bolt threads being complementary to the internal threads of the first receiving component; and
  a cavity extending entirely through the head and shaft portions; the cavity having a linearly extruded segment, an extended diameter at the end face, and an enlarged diameter at the tip; the extended diameter being larger than a diameter of the linearly extruded segment; the enlarged diameter being larger than the diameter of the linearly extruded segment; the head portion being rounded between the extended diameter and the linearly extruded segment;
a second attachment bolt, comprising:
  a head portion having an end face;
  a shaft portion extending from the head portion, the shaft portion being threaded and having a tip distal to the head portion, the second attachment bolt threads being complementary to the internal threads of the second receiving component; and
  a cavity extending entirely through the head and shaft portions; the cavity having a linearly extruded segment, an extended diameter at the end face, and an enlarged diameter at the tip; the extended diameter being larger than a diameter of the linearly extruded segment; the enlarged diameter being larger than the diameter of the linearly extruded segment; the head portion being rounded between the extended diameter and the linearly extruded segment;
a first terminal element operatively coupled to or formed from the cable first end, the first terminal element having a diameter greater than the diameter of the linearly extruded segment of the first attachment bolt, the first terminal element being seated in the enlarged diameter of the first attachment bolt, at least one of the cable or an element operatively coupling the cable to the first terminal element passing through the linearly extruded segment of the first attachment bolt and the extended diameter of the first attachment bolt; and
a second terminal element operatively coupled to or formed from the cable second end, the second terminal element having a diameter greater than the diameter of the linearly extruded segment of the second attachment bolt, the second terminal element being seated in the enlarged diameter of the second attachment bolt, at least one of the cable or an element operatively coupling the cable to the second terminal element passing through the linearly extruded segment of the second attachment bolt and the extended diameter of the second attachment bolt;
wherein the threads of the first attachment bolt and the threads of the first receiving component couple the first attachment bolt to the first receiving component; and
wherein the threads of the second attachment bolt and the threads of the second receiving component couple the second attachment bolt to the second receiving component.

10. The system of claim 9, wherein the cable is in tension when the aircraft entry steps are at the use configuration.

11. The aircraft access system of claim 10, wherein:
the enlarged diameter of the first attachment bolt is angled, rounded in a concave manner, or rounded in a convex manner relative to the extruded segment of the first attachment bolt;
the linearly extruded segment of the first attachment bolt extends a majority of the length between the end face of the first attachment bolt and the tip of the first attachment bolt;
the linearly extruded segment of the first attachment bolt is generally cylindrical; and
the cavity of the first attachment bolt is generally centered along an imaginary center line that extends from the end face of the first attachment bolt to the tip of the first attachment bolt.

12. The aircraft access system of claim 11, wherein:
the enlarged diameter of the second attachment bolt is angled, rounded in a concave manner, or rounded in a convex manner relative to the extruded segment of the second attachment bolt;
the linearly extruded segment of the second attachment bolt extends a majority of the length between the end face of the second attachment bolt and the tip of the second attachment bolt;
the linearly extruded segment of the second attachment bolt is generally cylindrical; and
the cavity of the second attachment bolt is generally centered along an imaginary center line that extends from the end face of the second attachment bolt to the tip of the second attachment bolt.

13. A portion of an aircraft access system, comprising:
- a receiving component operatively coupled to entry steps or an aircraft fuselage;
- a cable;
- an attachment bolt, comprising:
  - a head portion having an end face;
  - a shaft portion extending from the head portion, the shaft portion having a tip distal to the head portion; and
  - a cavity extending entirely through the head and shaft portions; the cavity having a segment of generally constant cross-section extending a majority of the length between the end face and the tip, an extended diameter at the end face, and an enlarged diameter at the tip; the extended diameter being larger than a diameter of the generally constant cross-section; the enlarged diameter being larger than the diameter of the generally constant cross-section; and
- a terminal element operatively coupled to or formed from the cable, the terminal element having a diameter greater than the diameter of the generally constant cross-section, the terminal element being seated in the enlarged diameter, at least one of the cable or an element operatively coupling the cable to the terminal element passing through the segment of generally constant cross-section and the extended diameter;
- wherein the shaft portion of the attachment bolt is operatively coupled to the receiving component.

14. The portion of an aircraft access system of claim 13, wherein:
- the shaft portion of the attachment bolt is threaded;
- the receiving component is threaded complementary to the shaft portion threading; and
- the threading of the attachment bolt and the threading of the receiving component couple the attachment bolt to the receiving component.

15. The portion of an aircraft access system of claim 14, wherein the head portion is rounded between the extended diameter and the segment of generally constant cross-section.

16. The portion of an aircraft access system of claim 15, wherein the enlarged diameter is angled, rounded in a concave manner, or rounded in a convex manner relative to the segment of generally constant cross-section.

17. The portion of an aircraft access system of claim 16, wherein the segment of generally constant cross-section is generally cylindrical, and wherein the cavity is generally centered along an imaginary center line that extends from the end face to the tip.

18. The portion of an aircraft access system of claim 13, wherein the head portion is rounded between the extended diameter and the segment of generally constant cross-section.

19. The portion of an aircraft access system of claim 13, wherein:
- the enlarged diameter is angled, rounded in a concave manner, or rounded in a convex manner relative to the segment of generally constant cross-section; and
- the cavity is generally centered along an imaginary center line that extends from the end face to the tip.

20. The portion of an aircraft access system of claim 19, wherein the segment of generally constant cross-section is generally cylindrical.

* * * * *